3,644,652
Patented Feb. 22, 1972

3,644,652
METHODS OF COMBATING NEMATODES USING HEXACHLOROBUTADIENE
Daniel Demozay, Villeurbanne, France, assignor to Ets Pechiney-Progil, Lyon, France
No Drawing. Filed May 13, 1969, Ser. No. 824,299
Claims priority, application France, May 14, 1968,
50,012
Int. Cl. A01n 9/30
U.S. Cl. 424—351                                                  1 Claim

ABSTRACT OF THE DISCLOSURE

The disclosure concerns a parasiticidal composition intended chiefly for the killing of nematodes containing as an active material hexachlorobutadiene $$CCl_2=CCl—CCl=CCl_2$$

A method for destroying nematodes consisting of applying a lethal amount of nematode-killing hexachlorobutadiene to the nematodes.

---

Our invention relates to a parasiticidal chiefly nematode-killing composition for agricultural purposes, said composition including as an active component hexachlorobutadiene the formula of which is $$CCl_2=CCl—CCl=CCl_2$$

We shall designate said component hereinafter by the initials HCBU. For about twenty years the ravages made by nematodes which are parasites for all crops have been continuously increasing in importance. Most cultivations such as market-gardening, vineyards, flower and fruit cultivation in mild climates are subjected to the attack of nematodes belonging chiefly to the following genera: Meloidogyne, Pratylenchus, Xiphinema, Heterodera, etc.

Similarly very numerous cultivations under hot climates, chiefly those of tropical fruit such as bananas, pineapples, citrus fruit and the like are subjected to considerable damage ascribable in particular to *Radolphus similis*, Meloidogyne sp., Pratylenchus sp., Helicotylenchus, Tylenchus semi-penetrans, etc.

The considerable losses to which infested cultivations are subjected provide justification of the great interest given to the obtention of products capable of killing the nematodes.

Now our work has shown that HCBU has extremely interesting properties as far as the killing of nematodes is concerned so that it may be used successfully both as a prevention and as a cure for fighting said parasites.

HCBU has been known for a long time and it was described first by Besson in 1893 (Comptes. Rendus de l'Académie des Sciences, 116,102). It remained, however, for a long time a simple laboratory product and it is only since it has been shown that said compound may be produced readily starting from hydrocarbons obtained from petroleum products such as acetylene, butane or butadiene that attention has been focused on its possible applications.

HCBU is now used chiefly as a solvent for rubber, as a hydraulic fluid, for electric insulation or as a solvent chiefly for spectroscopic purposes.

With respect to its biological properties, numerous works have shown that HCBU is provided with various pest-destroying properties. It has also been described as a weed-destroyer (see U.S. Pat. 2,713,535 to Monsanto Chemicals) and as a seaweed destroyer (Isvestia Akademii Nauk SSSR Moscow 1960, page 165). It is also a well-known fact that said compound exerts an insecticidal action on numerous parasites and chiefly on the larvae of *Musca domestica*, *Tribolium confusium* and *Ephestia kuhniella*, on the grown-up *Sitophilus granarius*, on the pups of *Blatella germanica* and *Oncopeltus fasciatus* (Brown, Canadian Journal Research 1948, 177 and 188) as well as on grown-up *Tribolium sitophilus* and *Oryzaephilus* (Brown, Journal of Economic Entomology 42, 399, 1949).

Levinson has also investigated its action on the preliminary marginal stage of house flies (Rivista de parasitologia, 17, 51, 1956).

As a matter of fact, the chief interest of HCBU in the field of antiparasitic action is a result of its activity on the root-eating Phylloxera which is one of the most dangerous parasite insects in vineyard (Kogan & Prints, Doklady Akademia Nau SSSR 133, 246 1960) (Prints Gradinar Iozar Nauka 2, 5, 661, 665, 1965 the contents of which are found again in Review of Applied Chemistry series A, 56, 52, abstract 239, 1968).

None of said publications mentions however the intense nematode-killing action exerted by HCBU as brought to light by us. Such action on nematodes could not be foreseen, since nematodes and insects belong to entirely different animal sub-kingdoms. Furthermore experience has shown that very many insecticides and in particular those used for fighting the group of insects living within the ground, which group includes the Phylloxera cannot be used in practice as nematode killers. This is the case for instance of numerous chlorinated insecticides such as aldrine, hexachlorocyclohexane, dieldrine, heptachloro or phosphorus-containing compounds.

Now the following examples show that, in contradistinction with the precedingly mentioned compounds, HCBU shows in addition to its insecticidal action a remarkably interesting nematode-killing capacity which is generally far superior to that of the products to be found on the market for the same purpose.

EXAMPLE 1

The infested ground is subjected to a nematode-killing treatment by means of an injecting nozzle at a depth of 20 cm. The ground is then covered during eight days with plastics so as to prevent any too speedy release of the compound. Carrots were sown twenty-eight days after said treatment. The number of nematodes present in the ground were then counted at different times through removal of samples constituted by 50 grs. of earth. The results obtained are given by the following tabulae showing the percentage of nematodes found after $n$ days with reference to test samples defined by the figure 100. The nematodes found were Rhabditis sp. and Meloidogyme sp.

| Product used and measured as active material | 0 day before treatment | Counting obtained after (days)— | | | |
|---|---|---|---|---|---|
| | | 60 | 90 | 150 | 180 |
| Comparative sample untreated | 100 | 100 | 100 | 100 | 100 |
| DD [1] 400 litres/hectare | 100 | 10 | 30 | 100 | 75 |
| HCBU 270 litres/hectare | 100 | 50 | 10 | 5 | 20 |
| HCBU 360 litres/hectare | 100 | 10 | 10 | 5 | 10 |

[1] DD is a mixture of dichloropropane and dichloropropene which is a nematode-killer to be found on the market.

Said results show the excellent activity of HCBU since, for amounts which are slightly lower than that of the commercial DD (360 against 400 litres/hectare), the HCBU provides an equivalent result after two months while it is considerably greater after five or six months.

EXAMPLE 2

Tests made on parasitic nematodes of banana trees (*Radolphus similis*).

The treatment is executed with an injecting nozzle over 1 sq. m. round each tree. Each test includes four elementary treatments on small parcels of land carrying ten trees. The average of the four measurements made led to the results appearing in the following tabulae showing the percentage of nematodes found in the ground after one month and after three months.

| Product used and amount used | Number of present nematodes after— | |
|---|---|---|
| | 1 month | 3 months |
| Comparative sample untreated | 100 | 100 |
| HCBU 30 cu. cm. of active material per tree | 18 | 13 |
| DBCP [1] 30 cu. cm. of active material per tree | 43 | 22 |

[1] Dibromochloropropane which is a commercial nematode killer.

The results of said tests have brought to light the interest of our improved compositions since for equal amounts of active material HCBU produces a lethal action on the nematodes which is about twice higher than that obtained with one of the nematode killers which are to be found most frequently on the market.

The nematodes described in the preceding examples are given out merely by way of exemplifications of said family of parasites and should not be considered as forming an exhaustive listing of the nematodes which may be killed by HCBU.

Obviously the activity of the compound considered is exerted on all species of nematodes which are parasites living in the ground and our invention covers consequently all nematode-killing compositions wherein the active component or one of the active components is HCBU.

For practical use HCBU may be used pure or as a solution adapted to be emulsified in conventional organic solvents, the solution containing 50 to 99% of active material to which may be added one or more of the reagents generally used for the applications to be considered.

HCBU may also serve alone or in admixture with other known insecticidal or nematode-killing products, for instance chlorinated hydrocarbons, whether saturated or otherwise, such as endrine, dieldrine, heptachlore, lindane, DDT, chlorothiopine, dibromochloropropane, dichloropropane, dichloropropene or a mixture of dichloropropane and dichloropropene, chloropicrine, methyl bromide, ethylene dibromide or again metal carbamates or thiocarbamates such as metamsodium or aryl carbamates, phosphoric esters and the like or any other product capable of increasing or reinforcing its activity spectrum and of thus obtaining through a single treatment a more complete destruction of the parasitic infestation of the ground.

The amounts of products to be used depend on the conditions of use, on the sensitivity of the parasites to be killed by HCBU and also on the intensity of infestation. Generally speaking amounts of 100 to 1000 litres of active material per hectare sufficient for obtaining an excellent destruction in the ground of the pests.

What is claimed is:

1. A method for destroying the nematodes in the ground comprising applying to said nematodes a lethal amount of a hexachlorobutadiene of the formula:

$$CCl_2=CCl-CCl=CCl_2$$

References Cited

UNITED STATES PATENTS 2,713,535  7/1955  Patrick, Jr. _____ 71—2.7
2,745,885  5/1956  Ruh et al. _____ 260—653

OTHER REFERENCES

Kogan et al., Chem. Abst., vol. 54, 1960, p. 25486.
Prints et al., Chem. Abst., vol. 59, 1963, p. 2116.
Brown, Chem. Abst., vol. 44, 1950, pp. 270–271.
Brown et al., Chem. Abst., vol. 42, 1948, p. 7911.
Levinson, Chem. Abst., vol. 51, 1957, pp. 18442–18443.

ALBERT T. MEYERS, Primary Examiner

A. J. ROBINSON, Assistant Examiner